United States Patent Office 2,752,090
Patented June 26, 1956

2,752,090

CENTRIFUGAL SEPARATORS

James L. Kyselka, Fife Lake, Mich., and Floyd A. Kent, deceased, late of Midland, Mich., by Violet B. Kent, administratrix, Midland, Mich., assignors of twenty per cent to Robert S. Mode and twenty per cent to Roland P. Place, Midland, Mich.

Application August 29, 1952, Serial No. 307,041

4 Claims. (Cl. 233—29)

This invention relates to centrifugal separators in general and more particularly to a device for separating liquids of different specific gravities, such as brine and other impurities, from crude oil.

One of the prime objects of the invention is to design a highly efficient bottom feed separator of simple construction for use in the oil fields to separate the brine, sludge, and other impurities from the crude oil before shipping the oil to the refinery for cracking and final refining, thus effecting a considerable saving in transportation and handling costs.

A further object of the invention is to design a bottom feed separator which is highly reliable in operation and which very effectively separates the crude oil from the brine and other impurities which are present in crude oil in varying proportions, thus insuring that the cracking and distilling processes are not retarded by the presence of these undesirable components.

Another object of the invention is to design a separator provided with a plurality of superimposed compartments through which the crude oil travels so that a progressive separation is attained, the centrifugal force created by rotation of the separator bowl forcing the heavy brine and other impurities outwardly so that they may be drained from the separator, while the lighter oil rises centrally through the compartments to a higher level from which it may be separately drained to a separate tank or receptacle.

A further object of the invention is to design a separator wherein a central tubular shaft both drives the separator bowl and serves as an intake pipe for feeding the crude petroleum into the bowl.

A further object of the invention is to design a separator from which the thick sludge may be easily removed, and wherein the sludge rotates within the separator bowl until the separator is stopped for cleaning, thus eliminating any possibility of plugging and/or preventing rotation of the bowl.

A further object of the invention is to design a separator which is effective at relatively low speeds.

A still further object of the invention is to design a separator of high capacity, which can be readily moved from one location to another, and which can be economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 1:
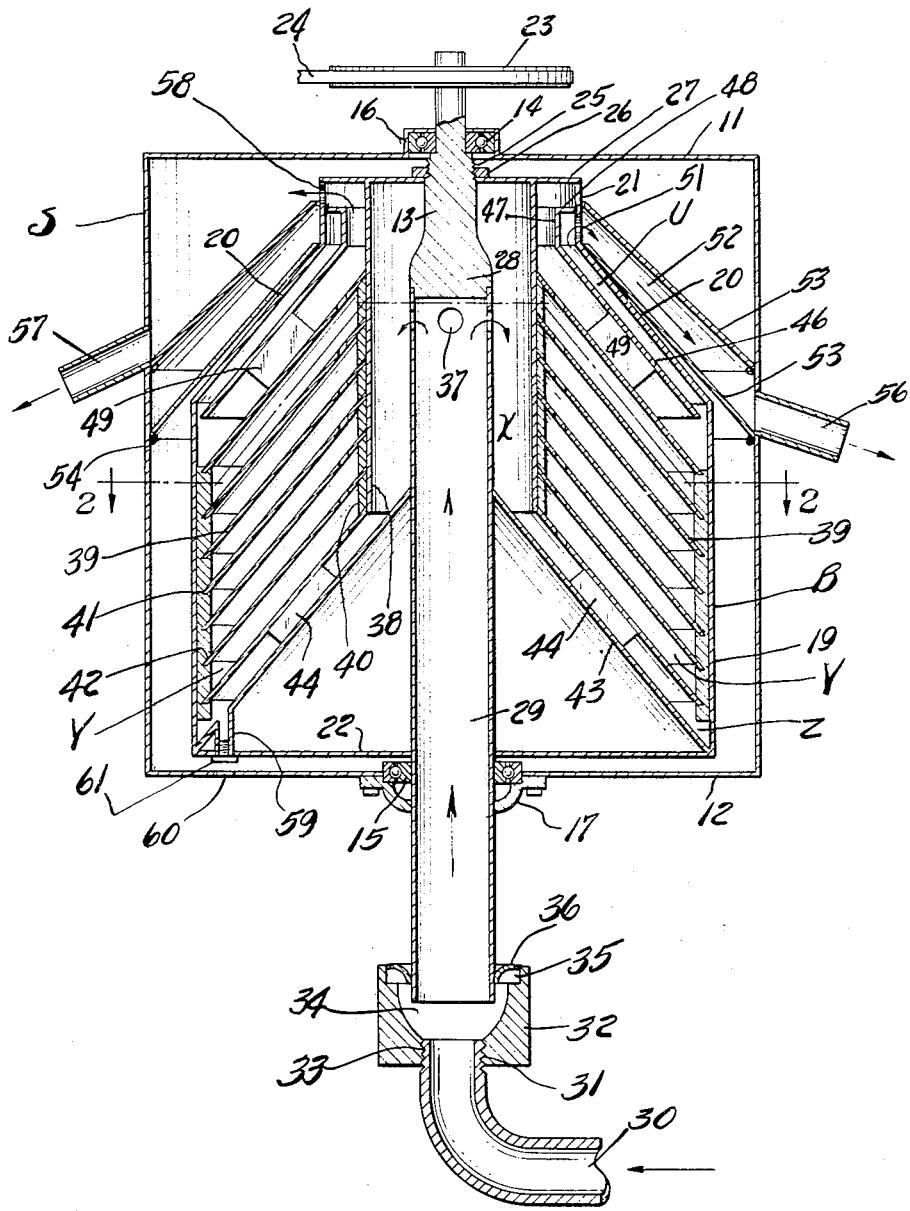
Fig. 1 is a sectional, side elevational view through the separator, the arrows indicating the directions of flow of both the oil and brine.
Figure 2:
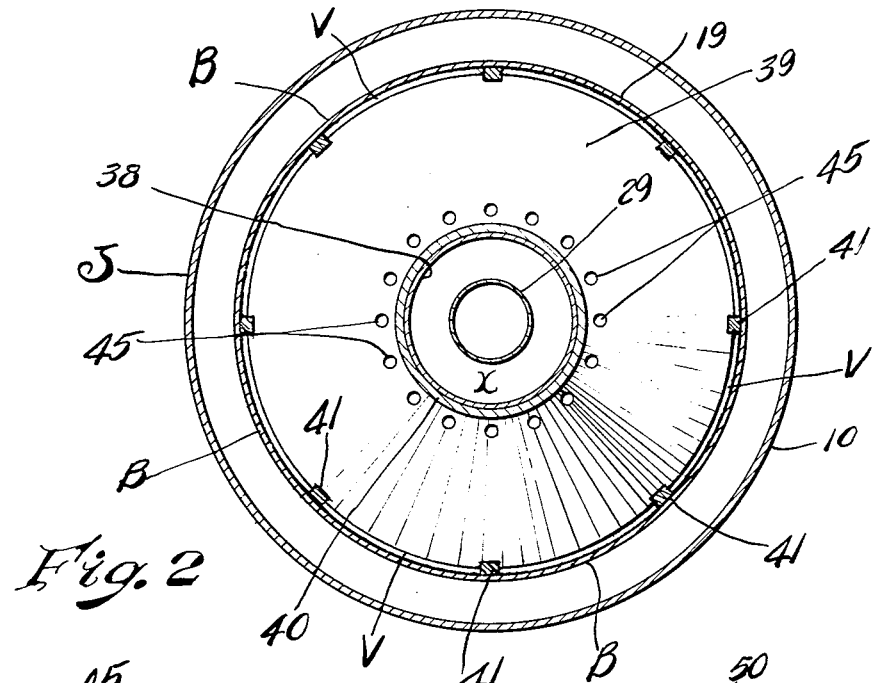
Fig. 2 is a top plan view thereof taken on the line 2—2 of Fig. 1.
Figure 3:
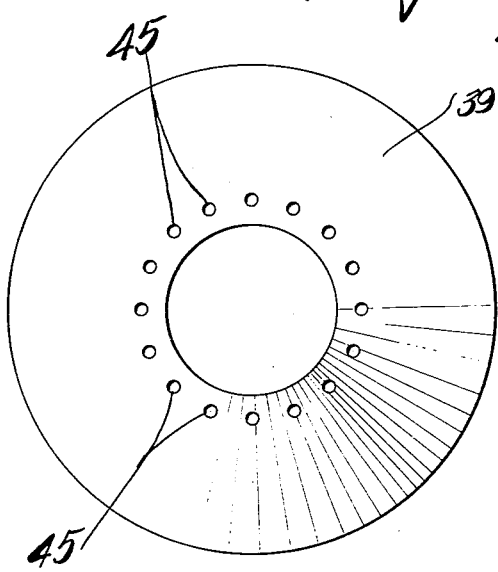
Fig. 3 is a plan view of one of the disks in the disk pack.
Figure 4:
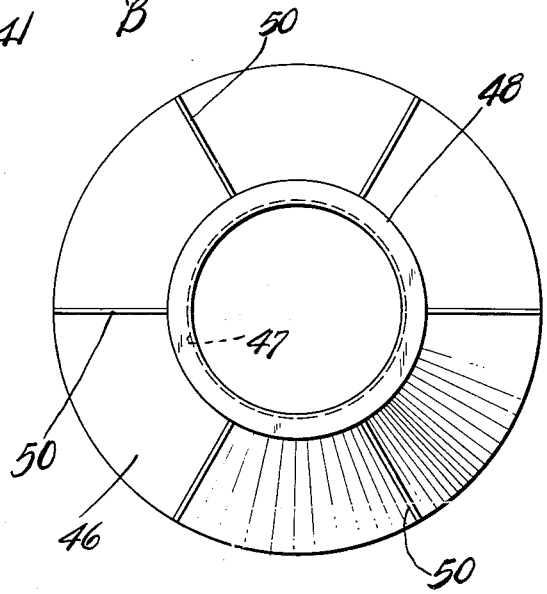
Fig. 4 is a top plan view of the uppermost disk in the separator.

Referring now more particularly to the accompanying drawings, a letter S generally indicates the separator which includes a cylindrical outer casing or tank 10 having centrally disposed, aligned openings in the top and bottom walls 11 and 12 thereof for the admission of a driven vertical shaft 13 which extends therethrough and is journaled in upper and lower bearings 14 and 15 provided in the upper and lower walls 11 and 12 respectively.

A bearing retainer 16 is provided for the upper bearing 14 and a bearing retainer 17 is bolted to the bottom wall 12 of the outer casing 10 and supports the lower bearing 15. Mounted concentrically on the shaft 13 to rotate therewith is a tubular inner casing or bowl B which includes a vertical side wall portion 19, a sloping side wall portion 20, a vertical head wall portion 21, and a bottom 22.

The shaft 13, which may be driven at controlled rates of speed in any desired manner as by connecting the pulley 23 and belt 24 to a suitable source of power (not shown), is enlarged and threaded as at 25, and a securing nut 26 is tightened down on the removable cover 27 of the bowl B to secure it firmly in position thereon. A portion of the shaft 13 is further enlarged and shouldered as at 28, and a tubular extension 29 is rigidly secured thereto to function as an intake pipe for the incoming crude petroleum.

A stationary, curved intake pipe 30, into which the crude petroleum is pumped in any suitable manner, feeds the mixture to the tubular intake portion 29 of the shaft 13 for delivery to the bowl B. The pipe 30 is threaded as at 31 and a connecting member 32, bored and threaded as at 33, is mounted thereon, and is centrally dished to form a chamber 34 into which the lower end of the shaft section 29 extends. The connecting member 32 is further recessed or interiorly shouldered in a manner to form a seat 35 for a seal 36 which prevents the crude oil from seeping out between the rotating shaft extension 29 and the stationary connecting member 32.

The crude oil which is pumped up into the intake extension 29 is admitted to the bowl B through circumferentially spaced ports 37 formed in the upper end of the intake 29 and passes into the annular central compartment X formed between the shaft 13 and the inner cylindrical shell 38 which is mounted centrally within the bowl B.

A plurality of spaced-apart, frusto-conical separating disks 39, separated by spacer rings 40 is connected to the cylindrical shell 38, and spacer bars 41, formed with downwardly sloped grooves 42 to accommodate and support the outer peripheral edges of the disks 39 are mounted on the side wall portion 19 of the bowl B. Thus, a plurality of superimposed passageways or compartments Y are formed between the disks 39, and a passageway or compartment Z is formed between the lowermost disk and the frusto-conical false bottom or lower wall 43 which is separated from the lowermost disks 39 by spacer blocks 44.

A plurality of vertically aligned, circumferentially spaced openings 45 are provided near the inner edges of the disks 39 for the upward passage of the lighter oil, while the heavier brine, which is thrown outwardly upon rotation of the bowl B, passes upwardly between the peripherally disposed spacer bars 41, through the passages V between the outer edges of the disks 39, and the side wall portion 19 of the bowl B.

Mounted above the disks 39 is a segregating disk 46 which is formed with a vertical hub portion 47, and a horizontal lip or flange 48 is secured to the vertical head wall portion 21 of the bowl B. This segregating disk 46 is spaced from the uppermost of the disks 39 by spacer blocks 49, and from the sloping portion 20 of the bowl wall B by ribs 50 formed integral with the disk 46. The outer peripheral edge of the disk 46 is further spaced from the side wall 19 of the bowl B, as are the disks 39, to allow the brine and other impurities to pass upwardly to the passageway U formed between the portion 21 of the wall of the bowl and the disk 46, and thence through the lower ports 51 in the vertical head wall 21 of the bowl B into the downwardly angled, annular, enclosed trough 52 which is made up of the frusto-conical plates 53—53, these plates being secured to the wall portion 21 in any desired manner.

Gaskets 54 are interposed between the outer edges of the trough 52 and the outer casing 10 to prevent leakage of the brine etc.

The oil and brine are conveniently taken off at different levels, an outlet pipe 56 being provided through the side wall of the casing 10 in communication with the trough 52 to remove the brine and other impurities, and an outlet pipe 57 is provided through the side wall of the casing 10 above the trough 52 to receive the lighter oil which passes upwardly through the ports 45 in the disks 36, and thence up between the separating disk 46 and the shell 38, and out through ports 58 in the vertical head wall 21 of the bowl B.

A sludge pipe 59 extends through the bottom wall 22 of the bowl B up through the bottom plate 43 to communicate with the chamber Z and receive the sludge which accumulates as the device is operated, and passages 60 are provided in the bottom wall 12 of the outer casing through which the sludge may be drawn off. The pipe 59 is normally closed by a plug 61 which may be removed when it is desired to clean the device.

In operation, the crude petroleum is pumped through the pipe 30 into the hollow, tubular extension 29 of the rotating shaft 13, thence flowing through ports 37 therein and into the chamber X in the bowl 18, and thence downwardly to the chamber Z. The centrifugal force created by the rotation of the bowl B forces the heavier brine and impurities outwardly to the wall of the bowl B, thence upwardly through the passages V to the passages U, and thence into the discharge trough 52. The lighter oil remains near the openings 45, rising upwardly through each succeeding compartment Y and thence out through ports 58 above the trough 52. It will be obvious that the separation of the brine and oil is not completely effected in the compartment Z, but rather is progressive as the oil rises up through the compartments Y, so that when the oil is finally discharged through ports 58, a relatively high degree of purity has been obtained. The sludge tends to settle out within the compartment Z and can be removed at periodic intervals as necessary.

It will be obvious that the device will be useful in many other fields, and we wish to make it clear that we do not desire to limit the operation of the device to the separation of crude petroleum.

What we claim is:

1. In a centrifugal separator, a substantially cylindrical, substantially closed casing, vertical drive shaft extending therethrough from end-to-end thereof, said casing being mounted concentrically on said shaft to rotate therewith, the greater portion of said shaft being hollow to admit a liquid mixture forced thereinto and formed with ports therein adjacent the upper end of said tubular portion opening into said casing, a cylindrical shell mounted concentrically within said casing and spaced from said shaft to form an annular chamber therebetween the lower end of said shell being spaced from the bottom of said casing to provide an annular passage out of said shell, vertical spacer bars having upwardly inclined, vertically spaced slots therein mounted on the wall of said casing, a plurality of superimposed, conical separating disks with the outer peripheral edges thereof accommodated in said slots, said disks connecting with said shell to form a series of vertically spaced compartments, said slots terminating short of the outer surfaces of said bars the outer peripheral edges of said disks are spaced from the casing to form passages between said spacer bars and permit the upward passage of the heavier components of said liquid mixture, openings near the inner edges of said disks for the passage of the lighter components of the liquid mixture upwardly through said compartments to effect a progressive separation, means for removing the heavier components from said casing, and means for separately removing the lighter components from said separator.

2. In a centrifugal separator, a casing, a driven shaft for rotatably driving said casing and extending therethrough, the greater portion of said shaft being tubular to admit a liquid mixture, a stationary connecting member formed with an enlarged chamber of greater diameter than said tubular shaft into which the lower end of said shaft extends, gasket means interposed between the marginal wall of said chamber and the outer wall of said tubular shaft, a supply pipe communicating with said chamber, the tubular portion of said shaft having ports adjacent the upper end thereof to admit the liquid mixture to the casing, a plurality of separating disks in said inner casing with their peripheral edges spaced from the side wall of the inner casing to form vertical passages for the heavier components of the liquid mixture, centrally disposed, aligned ports in the disks for the upward passage of the lighter components of the liquid mixture, means mounted above the disks for segregating the heavier and lighter liquid components, and means for separately drawing off the heavier and lighter components.

3. The combination as defined in claim 1 in which a conical lower section is provided for said casing, said bars terminating short of said lower section, and a sludge pipe extending into the lower wall of said casing adjacent the outer edge thereof.

4. In a centrifugal separator, a substantially cylindrical, closed casing, a drive shaft, said casing being mounted concentrically on said shaft to rotate therewith, means for admitting a liquid mixture to the central portion of the casing, vertical spacer bars mounted on the wall of said casing, said casing having a conical lower wall and said bars terminating short of said wall, a plurality of superimposed separating disks including openings in the central portions thereof with the outer peripheral edges thereof connected to said bars to provide a series of vertically spaced, annular passageways guiding the heavier components of said mixture outwardly, the outer peripheral edges of said disks being spaced from the casing to form passages between said spacer bars to permit the upward passage of the heavier components of said liquid mixture, said openings in the disks permitting the passage of the lighter components of the mixture upwardly through said compartments to effect a progressive separation, means for receiving the heavier components from said casing, and means for separately removing the lighter components from said casing, and a sludge pipe extending through the lower wall of said casing adjacent the outer edge thereof.

References Cited in the file of this patent

UNITED STATES PATENTS

| 1,283,343 | Snyder | Oct. 29, 1918 |
| 1,718,081 | Ruda | June 18, 1929 |
| 1,749,764 | Forsberg | Mar. 11, 1930 |
| 1,759,522 | Schmitz | May 20, 1930 |
| 1,831,500 | Lindgren | Nov. 10, 1931 |
| 2,325,871 | Muerle | Aug. 3, 1943 |
| 2,628,021 | Staaff | Feb. 10, 1953 |